United States Patent [19]

Smith

[11] Patent Number: 5,154,369

[45] Date of Patent: * Oct. 13, 1992

[54] SPINNING-TYPE FISHING REELS WITH IMPROVED LINE HANDLING

[76] Inventor: Benny E. Smith, 100 Crispell Lake Rd., Lot 38, Clarkslake, Mich. 49234

[*] Notice: The portion of the term of this patent subsequent to May 1, 2007 has been disclaimed.

[21] Appl. No.: 502,539

[22] Filed: Mar. 30, 1990

Related U.S. Application Data

[63] Continuation-in-part of Ser. No. 326,102, Mar. 20, 1989, Pat. No. 4,921,188, which is a continuation-in-part of Ser. No. 279,339, Nov. 30, 1988, abandoned, and a continuation of Ser. No. 224,176, Apr. 27, 1988, abandoned, and a continuation of Ser. No. 103,546, Oct. 1, 1987, abandoned, and a continuation of Ser. No. 904,291, Sep. 8, 1986, abandoned, and a continuation-in-part of Ser. No. 730,491, May 6, 1985, abandoned.

[51] Int. Cl.⁵ ............................................. A01K 89/01
[52] U.S. Cl. ..................................................... 242/233
[58] Field of Search ........................ 242/231, 233, 232

[56] References Cited

U.S. PATENT DOCUMENTS

| | | | |
|---|---|---|---|
| 2,586,921 | 2/1952 | Delphon | 242/228 |
| 2,966,314 | 12/1960 | Mombur | 242/233 |
| 3,036,788 | 5/1962 | Gentusa | 242/230 |
| 3,095,158 | 6/1963 | Louison | 242/233 |
| 3,116,894 | 1/1964 | Rule | 242/232 |
| 3,226,873 | 1/1966 | Wood | 242/233 |
| 3,233,845 | 2/1966 | Inamura | 242/233 |
| 3,342,442 | 9/1967 | Brantingson | 242/233 |
| 3,743,207 | 7/1973 | McMickle | 242/233 |
| 4,350,312 | 9/1982 | Masclet | 242/233 |
| 4,676,450 | 6/1987 | Carpenter et al. | 242/233 |
| 4,921,188 | 5/1990 | Smith | 242/233 |

FOREIGN PATENT DOCUMENTS 546274 11/1957 Italy ...................................... 242/232

Primary Examiner—Katherine Matecki
Attorney, Agent, or Firm—Wood, Phillips, Van Santen, Hoffman & Ertel

[57] ABSTRACT

An open-face spinning-type fishing reel with a rotor having a bail unit with line holding structure for engaging line from a spool with the bail unit in its open position to prevent line payout. In one form of the invention, the bail unit has a line receiving opening with a generally U-shaped line seat at the base thereof. As the rotor rotates, the U-shaped seat engages the line and guides the line around the spool as the rotor rotates. The invention contemplates a mechanism for blocking the line in the line receiving opening with the bail unit in its open position to prevent the line from freely unwinding from the spool. In one form of the invention, the line holding structure is a pin that is movable by at least one of pivoting and sliding motion into a blocking position. The invention, in addition to providing improvements to prior known spinning-type fishing reels, may be utilized to create such form of reels comprising the invention's own structured crank, trigger and related mechanisms. Also, the new improvements are applicable to all known spinning-type fishing reels including those equipped with crank operated bail return features, variable spool reciprocation, interchangeable spools, and similar mechanical and functional features.

28 Claims, 9 Drawing Sheets

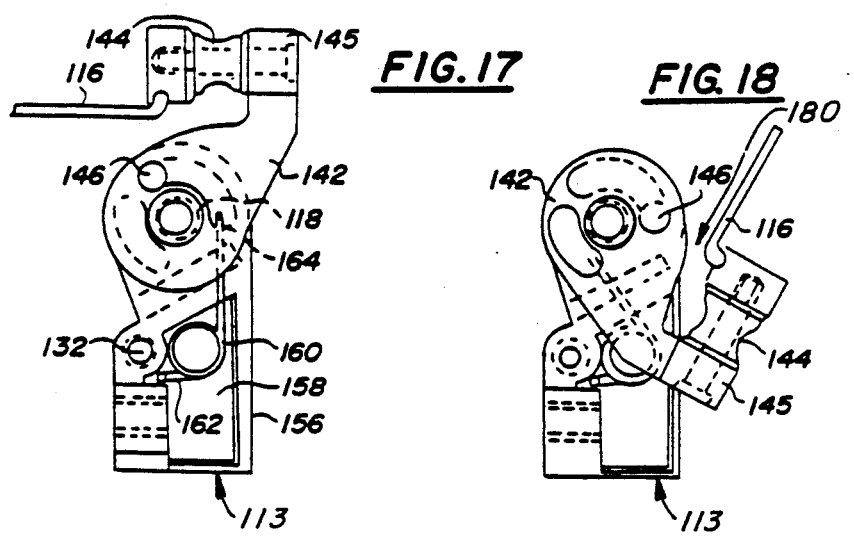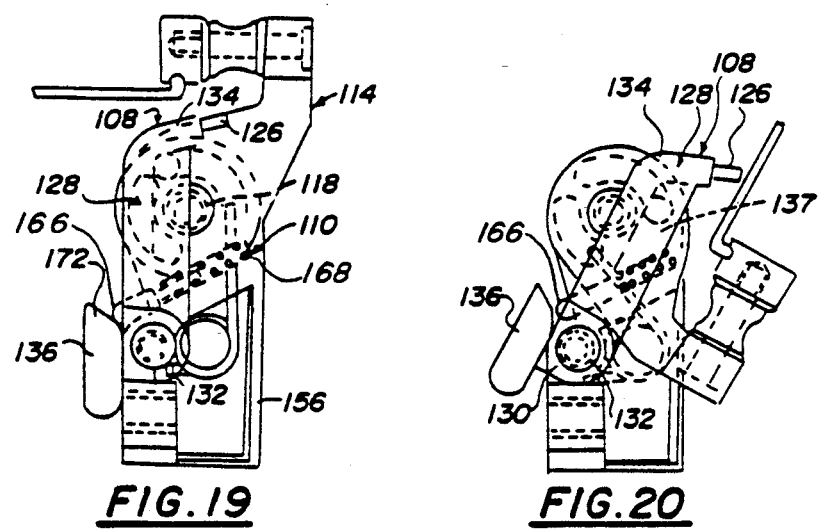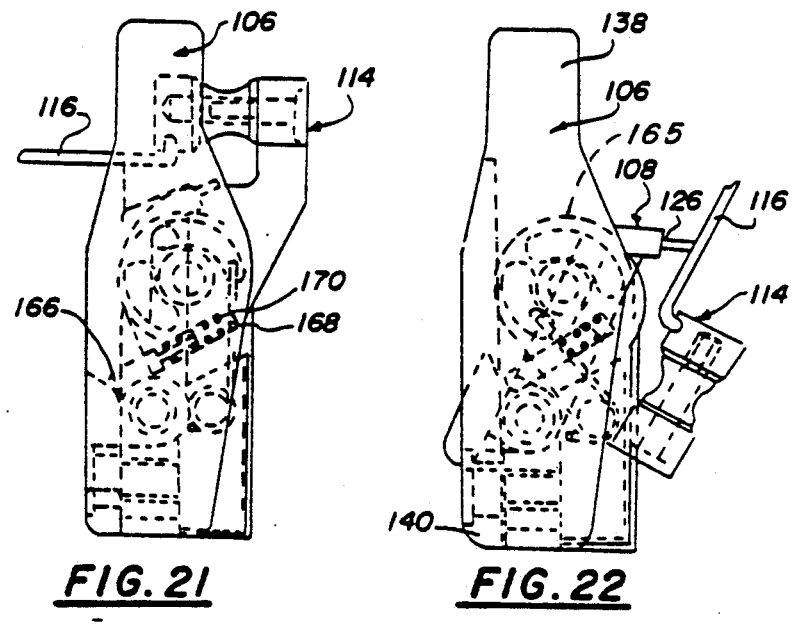

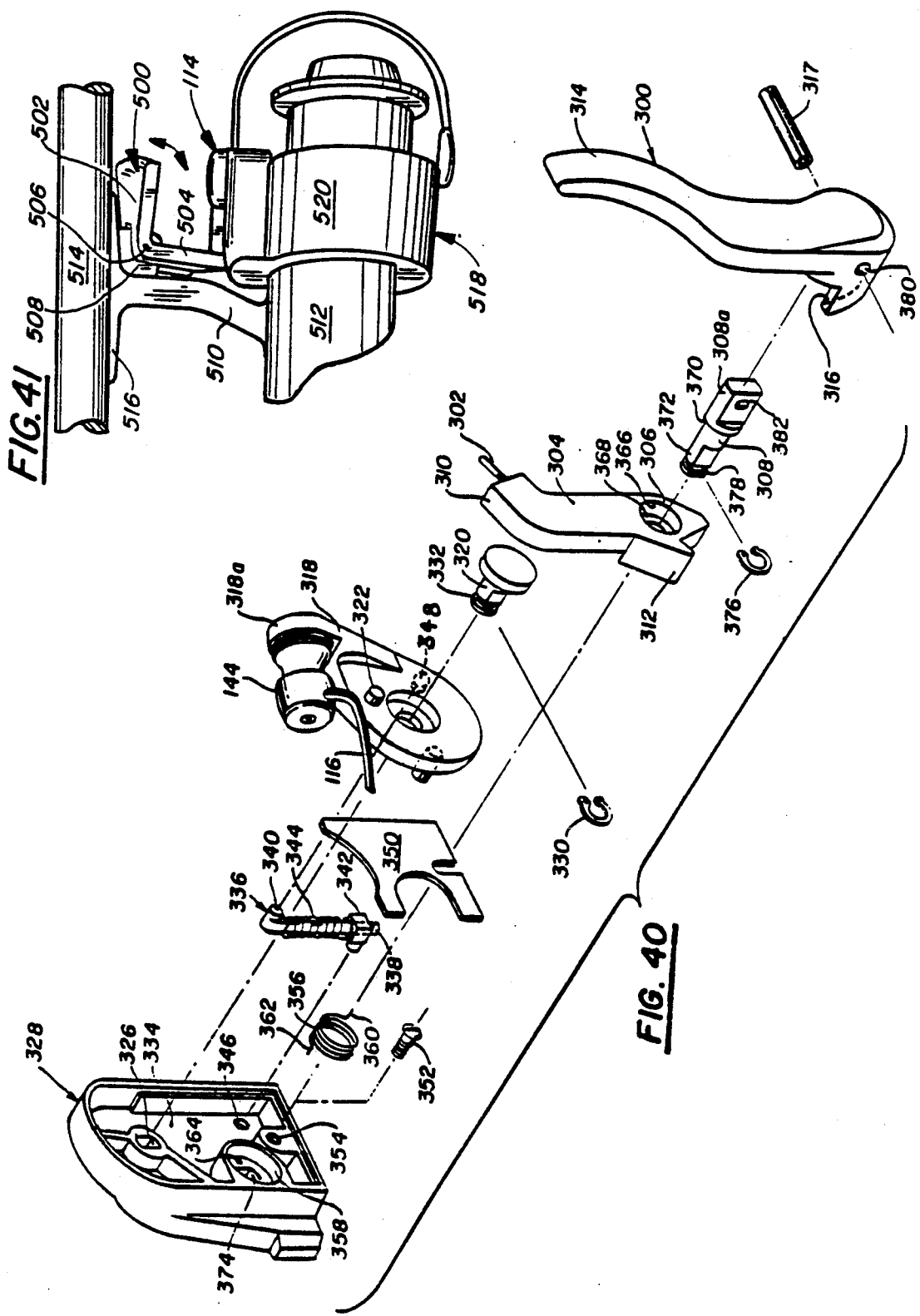

SPINNING-TYPE FISHING REELS WITH IMPROVED LINE HANDLING

CROSS REFERENCE

This application is a continuation-in-part of copending patent application Ser. No. 326,102, which issued as U.S. Pat. No. 4,921,188 May 1, 1990, and was filed Mar. 20, 1989, which, in turn, is a continuation-in-part of Ser. No. 279,339, filed Nov. 30, 1988, as a continuation of application Ser. No. 224,176, filed Apr. 27, 1988 as a continuation of Ser. No. 103,546, filed Oct. 1, 1987 as a continuation of Ser. No. 904,291, filed Sept. 8, 1986 as a continuation-in-art of Ser. No. 730,491, filed May 6, 1985. With the exception of application Ser. No. 326,102 all other applications are now abandoned.

BACKGROUND OF THE INVENTION

1. Field of the Invention

This invention relates broadly to open-face, spinning-type fishing reels. More particularly, it concerns such reels in which the reel's fishing line is automatically handled so users need not directly contact the line with a finger during casting with the reels.

2. Description of the Prior Art

In the world of sport-fishing, there are two basically different types of reels commonly in use. First, there are the straight-casting type in which the winding spool rotates on an axis fixed at right angles to the length of the fishing rod. In such reels the spool rotates in one direction on the cast of the fishing line and in the opposite direction on line retrieval. Because of spool inertia, so-called "backlashes" frequently occur in the use of such reels.

The second type reels, the so-called spin-cast or spinning type reels (see U.S. Pat. No. 3,743,207), enjoy great popularity because they have little tendency to backlash. In such reels, the spool axis is aligned with the length of the fishing rod and it does not usually rotate. Instead, the line is wound on the spool during the retrieval mode by a rotatable rotor/bail. The present invention concerns this open-face spinning-type fishing reels.

In order to assist fisherman in the use of spinning-type reels, various types of trigger mechanisms have been disclosed and incorporated into such fishing reels. One such type trigger mechanism serves to return the bail to a closed (line engaging) position upon completion of a cast (see U.S. Pat. No. 3,796,391). This type of bail return is also now more frequently accomplished by suitably structuring the reel crank mechanism to automatically return the bail to the closed position simultaneously with the movement of the reel's crank handle to retrieve the line.

In many spinning-type reels, the bail is moved by hand from its closed position to the opened position in preparation for a cast. Trigger mechanisms have been developed to assist in performing this necessary bail movement (See U.S. Pat. No. 3,342,442; 4,427,161 and 4,676,450). However, reels of this latter type still present a use problem since the fishing line must be grasped by a finger of the user in order to prevent it from unwinding off the spool as the trigger mechanism moves the bail into the open position in preparation for a cast.

There is a need for improvement in spinning-type reels to eliminate the use of an operator's finger to retain line as a part of fishing operations using such reels. This invention provides such improvement.

OBJECTS

A principal object of the invention is the provision of unique automation improvements in open-face spinning-type fishing reels. Further objects include the provision of improved open-face spinning-type fishing reels that:

1. Enable the user to move the reel's bail from the closed to the opened position in preparation to cast without the user's having to grasp or otherwise contact the fishing line with a finger.

2. Permit the user to move the bail via a trigger operated by the same hand that holds the fishing rod and, at the same time, automatically control the line to prevent its unwinding from the reel until the trigger is released during the casting operation.

3. Make the operation of spinning-type fishing reels more automated.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the inclusion of a new type of trigger operated line control device in spinning-type fishing reels.

In a principal embodiment of the invention, the improvements thereof are applied to known open-face spinning-type fishing reels that have a reciprocating spool; a rotatable rotor/bail unit including a bail that swings about a pivot carried in the reel; a trigger assembly for swinging the bail from a closed, line winding position to an opened, line casting position; structure for temporarily holding the bail in the line casting (open) position and for releasing the bail to return to its line winding position at the completion of a cast of the fishing line; and crank means that reciprocates the spool along the longitudinal axis of the reel, rotates the rotor/bail unit around the spool and returns the bail after release by the trigger assembly to its line winding position at the completion of a cast.

The invention improvement comprises line holding means mounted on the bail unit of the reel for rotation therewith. Such means functions (a) to engage the fishing line as an incident of the bail being moved by the trigger assembly from the line winding position into the line casting position, (b) to retain the fishing line against unreeling with the bail in the line casting position and (c) to release the line to permit its unreeling from the spool upon the release of the trigger assembly in the process of casting of the fishing line.

The improvement also comprises means linking the line holding means to the trigger assembly to cause the means to perform the stated functions a–c.

Additionally, the bail may include a line guide portion that moves in an arc that intersects a guideway entrance. Further, the trigger assembly may include a pivoted trigger having a lateral cam portion that engages a crank arm to cause it to move upon movement of the trigger.

In a first embodiment of the invention, the line holding means comprises a guideway having an entrance into which the fishing line is moved by the bail unit as the bail unit is moved by the trigger assembly toward the line casting position and there is a pin that reciprocates across the guideway entrance to block and unblock the entrance. Advantageously, the pin is spring biased to move to unblock the guideway entrance and the trigger assembly comprises a pivoted crank arm that engages the pin to move it across the guideway entrance. Also, such crank arm serves to move the bail from the line winding position to the line casting position In second, third and fourth embodiments of the invention, the line holding means comprises a line engaging pin moved on a crank arm which, in turn, is moved by the trigger assembly so that such pin either picks up the line as the trigger assembly swings the bail from its closed position to its opened position or accepts the line as the bail realizes the open position therefor.

The invention also contemplates an improvement in a reel of the type having a spool onto which line is wound; a rotatable rotor for directing line onto the spool and including a bail unit movable between (a) a closed line winding position in which line from the spool is engaged by the bail unit to prevent unwinding of line from the spool in the absence of one of the spool and bail unit/rotor being rotated and (b) an open casting position in which line can pay out of the spool without rotation of the spool or rotor; and a trigger assembly including a trigger movable between a cocked position and an uncocked position.

The improvement comprehends a line holding structure on the rotor operated by the trigger assembly for engaging line from the spool with the bail unit in its open position and the trigger in its cocked position for preventing line from unwinding from the spool in the absence of rotation of at least one of the bail unit/rotor and spool.

In one form of the invention, the trigger causes the bail unit to move from its closed position to its open position as an incident of the trigger moving from its uncocked to its cocked position. With this arrangement, the trigger is a dual function element.

The trigger can be mounted either to a fixed housing on the reel or the rotor. The mounting of the trigger to the fixed housing assures ready access to the user, regardless of the rotor position.

Preferably, the trigger is pivotably movable between its cocked and uncocked positions. In one form, the trigger pivot axis is transverse to the rotational axis of the rotor. In a preferred form of the invention, the post that defines the pivot axis for part of the bail unit also serves as a mounting support for the trigger. The trigger pivot axis and bail unit rotational axis can be arranged to intersect one another.

In a preferred form, the line holding structure consists of a pin, preferably mounted on an arm that is movable relative to the rotor by pivoting action. The arm is movable relative to the rotor between a line holding position and a line release position. In the line holding position, the line is engaged by the pin and preferably wrapped partially therearound. In the line release position the line can pay out freely.

To effect movement of the line holding arm, there is cooperating structure on the trigger and arm causing the arm to move from its line release position to its line holding position as an incident of the trigger moving from the uncocked position to the cocked position.

There is also cooperating structure on the bail unit and at least one of the line holding structure and trigger assembly for moving the bail unit from its closed position to its open position as an incident of the trigger moving from its uncocked position to its cocked position. The trigger thereby effects operation of the line holding structure and the bail unit simultaneously.

In one style of open-face spinning-type fishing reel, the rotor has a bail unit that has a line receiving opening with a generally U-shaped line seat at the base thereof. As the rotor rotates, the U-shaped seat engages the line and guides the line around the spool as the rotor rotates.

The invention contemplates a mechanism for blocking the line in the line receiving opening with the bail unit in its open position to prevent the line from freely unwinding from the spool.

The invention, in addition to providing improvements to prior known spinning-type fishing reels, may be utilized to create such form of reels comprising the invention's own structured crank, trigger and related mechanisms. Also, the new improvements are applicable to all known spinning-type fishing reels including those equipped with crank operated bail return features, variable spool reciprocation, interchangeable spools, and similar mechanical and functional features.

BRIEF DESCRIPTION OF THE DRAWINGS

A more complete understanding of the invention may be had by reference to the accompanying drawings in which:

FIG. 17 is a partial, sectional view of the trigger assembly of the reel shown in FIG. 16.

FIG. 18 is a partial, sectional view similar to FIG. 17 showing another position of the line holding means of the invention in use of the reel.

FIG. 19 is another partial, sectional view of the trigger assembly of the reel shown in FIG. 16.

FIG. 20 is a sectional view similar to FIG. 19 showing another position of the line holding means of the invention in use of the reel.

FIG. 21 is a partial, plan view of the trigger portion reel also shown in section in FIGS. 17-20.

FIG. 22 is a plan view similar to FIG. 21 showing another position of the line holding means of the invention in use of the reel.

FIG. 40 is an exploded view of the fourth embodiment of the trigger assembly of the invention.

FIG. 41 is a partial perspective lateral view of a fishing reel as in FIG. 1 with a modified form of trigger according to the present invention.

In FIGS. 34-39 a cover plate on a base portion of the trigger assembly has been removed for the sake of showing arrangement of internal parts.

DESCRIPTION OF THE PREFERRED EMBODIMENT

Figure 1:
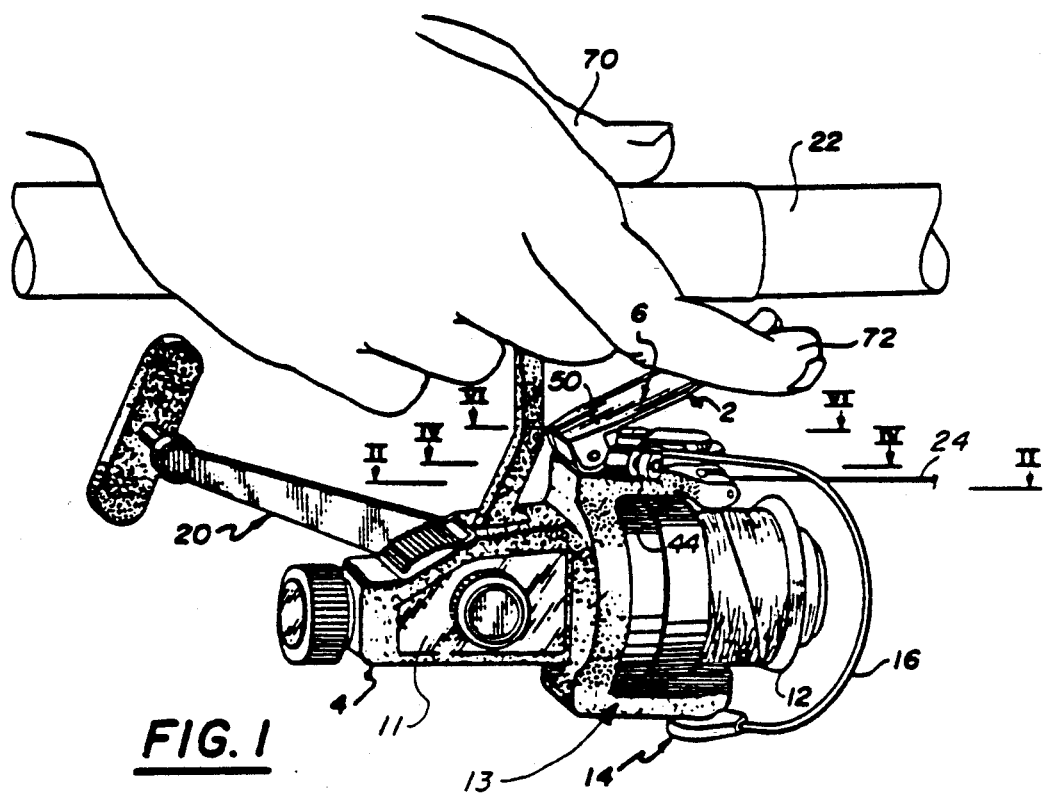
FIG. 1 is a perspective lateral view of a first embodiment of an open-face, spinning-type fishing reel constructed in accordance with the invention.

Referring in detail to the drawings, in which identical parts are identically marked, the invention in broad terms concerns an automatic line control device 2 as an improvement to a spinning-type fishing reel 4 that includes a trigger assembly 6. Basically, the control device 2 comprises line holding means 8 and means 10 linking the line holding means 8 to the trigger assembly 6.

Spinning-type fishing reels 4 improved by the invention comprise a housing 11 having thereon a reciprocating spool 12 and a rotatable rotor 13 including a bail unit 14 having a bail 16 that swings about a pivot 18.

The trigger assembly 6 is used for swinging the bail 16/bail unit 14 from a line winding (closed) position (see FIG. 4) to a line casting (opened) position (see FIG. 5), for temporarily holding the bail 16/bail unit 14 in the line casting position in the absence of a latch or spinning bias mechanism and for releasing the bail 16/bail unit 14 so it may be returned to its line winding position at the completion of a cast of the fishing line either by finger pressure or the bail 16 or by turning the crank means 20.

The reel 4 also comprises crank handle means 20 that reciprocates the spool 12 along the longitudinal axis of the reel 4 and the fishing rod 22, rotates the bail 16/bail unit 14 around such longitudinal axis for winding fishing line 24 around the spool 12 and returns the bail 16/bail unit 14 to its line winding position at the completion of a cast.

The line holding means 8 comprises a guideway 30 having an entrance 32 into which the fishing line 24 is delivered by the bail 16/bail unit 14 as the bail 16/bail unit 14 is moved by the trigger assembly 6 toward the line casting position.

The line holding means 8 also comprises a pin 34 that reciprocates across the guideway entrance 32 to block and unblock the entrance 32 The pin 34 is biased by a spring 36 to move to unblock the guideway entrance and the line holding means further includes a pivoted crank arm 40 with a butt portion 41 that engages the pin 34 to move it against the pressure of spring 36 across the guideway entrance 32. Also, the crank arm 40 engages the bail 16/bail unit 14 to move the bail 16/bail unit 14 from its line winding (closed) position to its line casting (open) position.

The bail unit 14 includes a crank 42 and line guide portion 44 that is moved by a crank 42 about pivot 18 in an arc that intersects the guideway entrance 32. The bail 16 and the line guide 44 are mounted to the crank 42 via a drilled offset portion 45.

The crank 42 includes a projection (pin) 46 that rides in a recess 48 in the crank arm 40 to cause the crank 42 to move in a clockwise direction upon similar movement of the crank arm 40. Since a recess 48 defined on the crank arm 40 is open at the right side 40a of arm 40, counter-clockwise moment of a crank arm 40 does not produce any movement effect on the crank 42 or the bail 16/bail unit 14. This permits the bail 16/bail unit 14 to remain in the open position therefor even as the pin withdraws from the entrance 32, an important effect in operation of the new control device 2, as will become more apparent in the operation description presented below.

The trigger assembly 6 includes a pivoted trigger 50 having a lateral cam portion 52 that engages the butt portion 41 of crank arm 40 to cause crank arm 40 to move upon movement of the trigger 50 between an uncocked position and a cocked position therefor The crank arm 40 is pivoted on the pin 54 that is screwed into the base portion 56 of the trigger assembly 6. Base portion 56 includes a recess 58 in which a coil spring 60 is captured One end 62 of the spring 60 bears on the recess 58 and the other end 64 hooks to the crank 42. The spring 60 is an overcenter spring to bias the bail 16/bail unit 14 into each of its open and closed positions, depending upon the relationship of the bail 16/bail unit 14 to its dead center location.

Base portion 56 also includes an arcuate recess 66 that functions with the pin 68 on crank 42 to limit the extent of clockwise movement of the crank 42 upon upward movement of trigger 50 and counter-clockwise movement of crank 42 upon release of the trigger 50.

The pivot 18 consists of a pin screwed into the trigger assembly base portion 56.

In the second embodiment shown in FIGS. 15-22, an automatic line control device 102 on the spinning-type fishing reel 104 includes a trigger assembly 106.

Basically, the control device 102 comprises line holding means 108 and means 110 linking the line holding means 108 to the trigger assembly 106.

The spinning-type fishing reel 104 comprises a reciprocating spool 112 and a rotatable rotor 113 with a bail unit 114 including a bail 116 that swings about a pivot 118.

The trigger assembly 106 is used for swinging the bail 116/bail unit 14 from a line winding (closed) position (see FIGS. 17 and 19) to a line casting (open) position (see FIGS. 18 and 20). Through either pressure applied directly to the bail 116 by the user or the use of a known mechanism, the bail 116/bail unit 114 can be returned to the closed position therefor.

The reel 104 also comprises crank handle means 120 that reciprocates the spool 112 along the longitudinal axis of the reel 104, rotates the bail unit 114 around such longitudinal axis for winding fishing line 124 around the spool 112 and, in certain reel versions, returns the bail 116/bail unit 114 to its line winding position at the completion of a cast.

The line holding means 108 comprises a pin 126 and crank arm 128 by which the fishing line 124 is moved by the bail 116 as the bail 116 is moved by the trigger assembly 106 toward the line casting position. The pin 126 and crank arm 128 move between a fishing line holding position as shown in FIG. 20 and a non-holding/release position as shown in FIG. 19.

The crank arm 128 is pivoted at the end 130 on a pin 132 while the free end 134 carries the pin 126. A butt portion 136 extends laterally from the end 130 of the arm 128 and there is a longitudinal channel 137 cut out of the underside of the arm 128.

Figure 10:
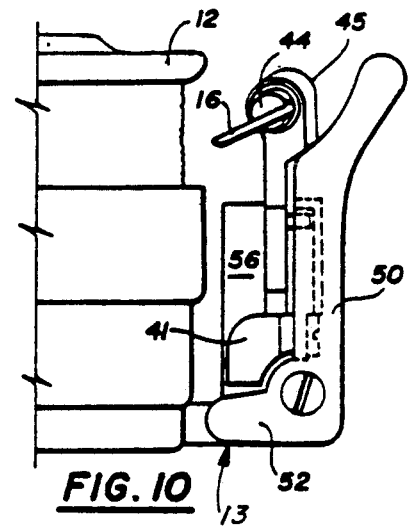
FIG. 10 is a lateral, fragmentary view similar to FIG. 9, but with the trigger in the released mode and the bail in the closed position.
Figures 11, 12:
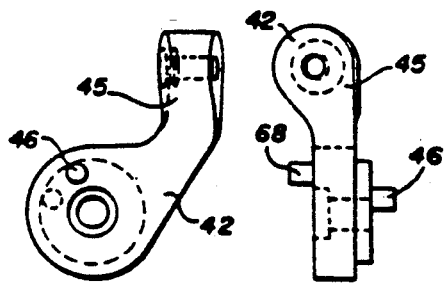
FIG. 11 is a plan view of a crank member used to move the bail in reels of the invention.
FIG. 12 is a lateral view corresponding to FIG. 11.
Figures 13, 14:
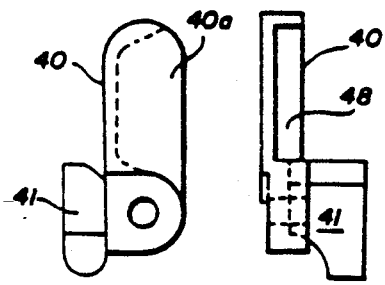
FIG. 13 is a plan view of a crank arm used to move the crank member and link a line holding member to a trigger assembly in reels of the invention.
FIG. 14 is a lateral view corresponding to FIG. 13.
Figure 15:
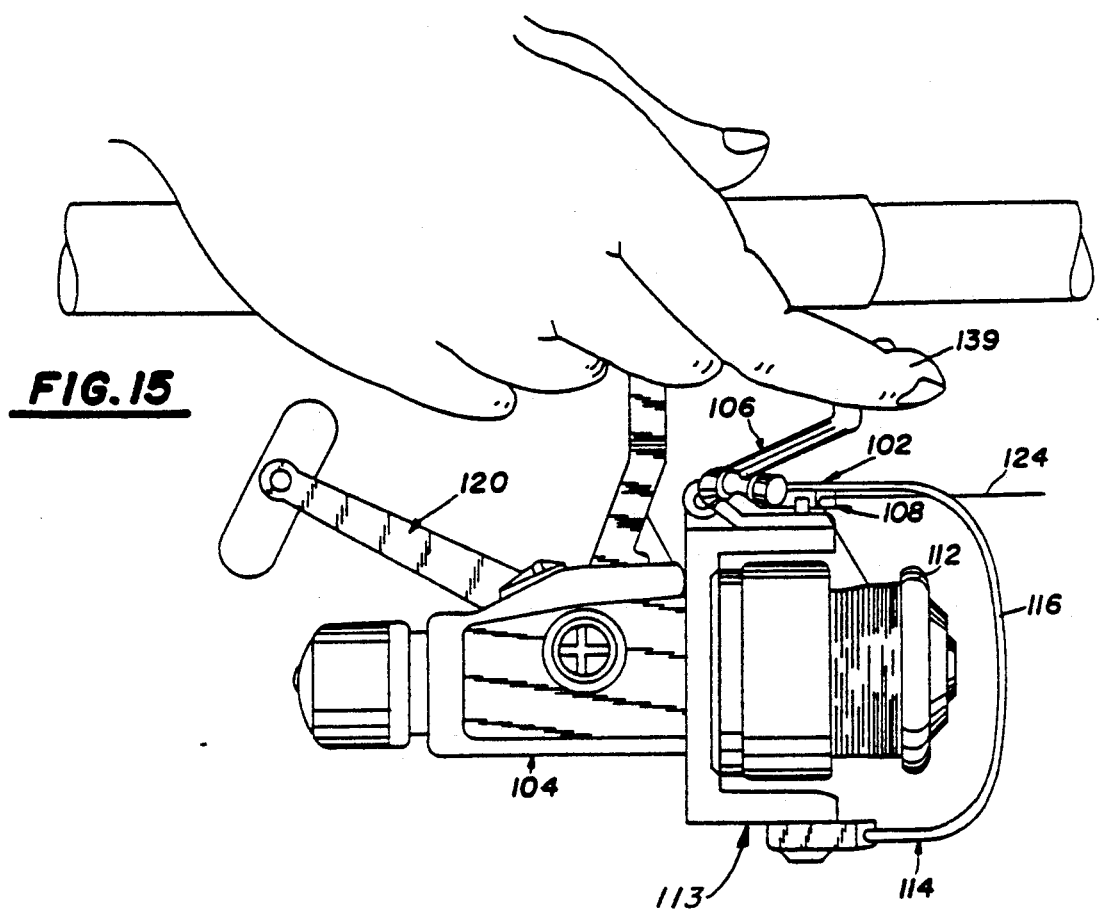
FIG. 15 is a right-side, lateral view of a second embodiment of an open-face spinning-type fishing reel constructed in accordance with the invention.
Figure 16:
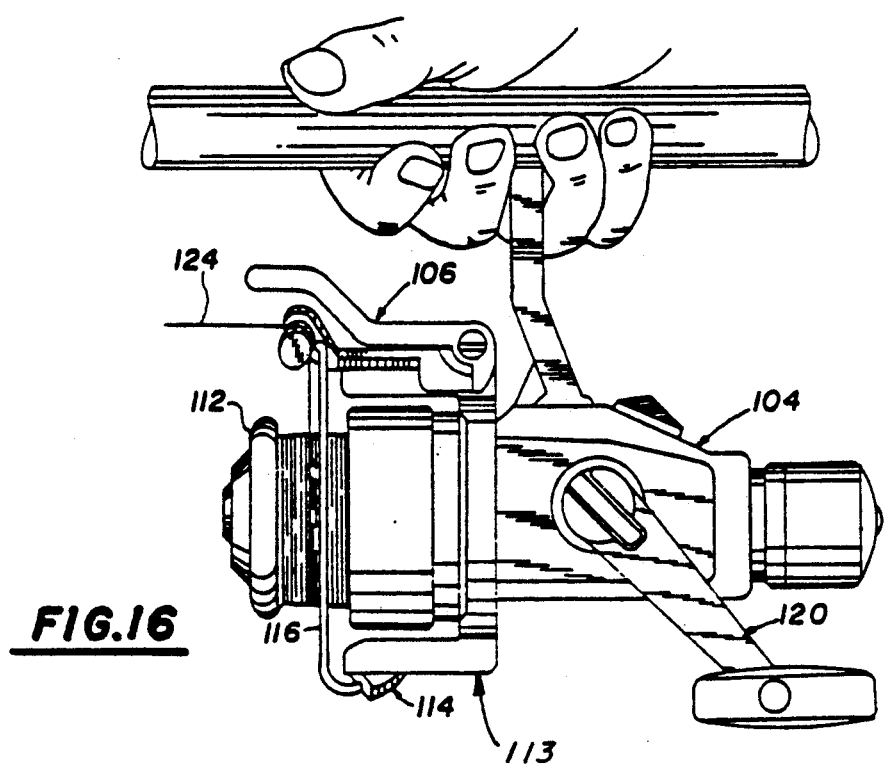
FIG. 16 is a left-side, lateral view of the open-face spinning-type fishing reel shown in FIG. 15.

The trigger assembly 106 includes a pivoted trigger 138 having a lateral cam portion 140 (similar to the portion 52 in FIG. 10) that engages the butt portion 136 of crank arm 128 to cause crank arm 128 to move clockwise, i.e., from the position shown in FIG. 21 to the position shown in FIG. 22, upon upward movement of the trigger 138, from an uncocked position to a cocked position, which occurs when a finger 139 of the user of the reel pulls the trigger to swing the bail 116/bail unit 114 from the closed position as shown in FIG. 16 into the opened position as shown in FIG. 15.

The bail unit 114 includes a crank 142 that moves about pivot 118 in an arc as shown by comparing FIG. 17 with FIG. 18. The bail unit 114 and the line guide 144 are mounted to the crank 142 via the drilled offset portion 145.

The crank 142 includes a projection (pin) 146 that rides in the channel 137 in the crank arm 128 to cause the crank 142 to move in a clockwise direction upon similar movement of the crank arm 128. Since the channel 137 is open at the right side of crank arm 128, counter-clockwise movement of crank arm 128 does not produce any movement effect on the crank 142 or the bail 116/ bail unit 114. This permits the bail unit 114 to remain in the opened position even as the pin moves counter-clockwise from the fishing line holding position shown in FIG. 22 to the line release position shown in FIG. 21, an important effect in operation of the new control device 102 as will become more apparent in the operation description presented below.

As previously stated, the crank arm 128 is pivoted on the pin 132 that is screwed into the base portion 156 of the trigger assembly 106. Base portion 156 includes a recess 158 in which a coil spring 160 is captured to swing from one stable position (see FIG. 17) through dead center to another stable position (see FIG. 18). One end 162 of the spring 160 bears on the recess 158 and the other end 164 hooks to the crank 142 to bias it toward the line winding (closed) position (FIG. 17) of the bail 116 in one of its stable positions and toward the line-freeing (open) position (FIG. 18) in the other of its stable positions.

Figure 2:
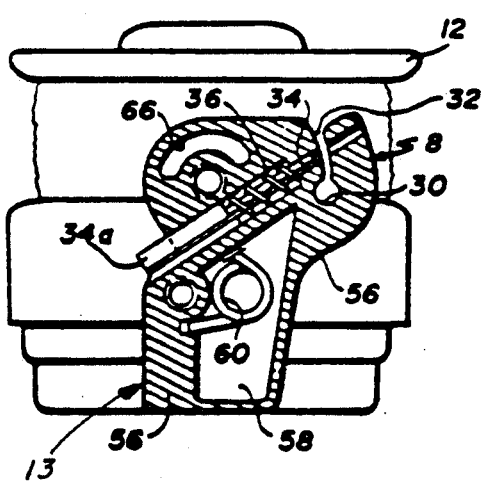
FIG. 2 is a partial, sectional view taken on the line II—II of FIG. 1.
Figure 3:
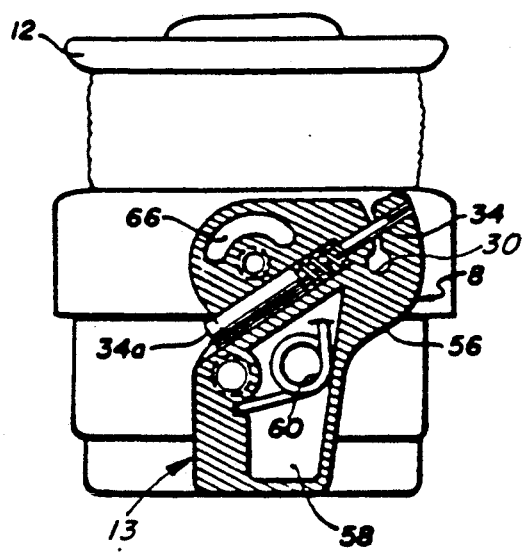
FIG. 3 is a sectional view similar to FIG. 2 showing another position of the line holding means of the invention in use of the reel.

Base portion 156 also includes an arcuate recess 165, similar to recess 66 in FIG. 2, that functions with a pin on crank 142 to limit the extent of clockwise movement of the crank 142 upon upward (cocking) movement of trigger 138 and counter-clockwise movement of crank 142 upon release of the trigger 138.

The pivot 118 consists of a pin screwed into the trigger assembly base portion 156.

The linkage means 110 includes a plunger 166 that compresses a spring 168 into an open-ended bore 170 in the base 156. The plunger 166 bears against the end 172 of butt 136 thereby biasing the arm 128 in the counter-clockwise direction.

Referring to FIGS. 23-27, a third embodiment of the new reel is illustrated which is, in effect, a simplified version of the second embodiment. Thus, the parts of the third embodiment are primarily like those of the second except for the manner in which the line engaging pin carrying crank arm is biased for return to the line releasing position.

Figure 24:
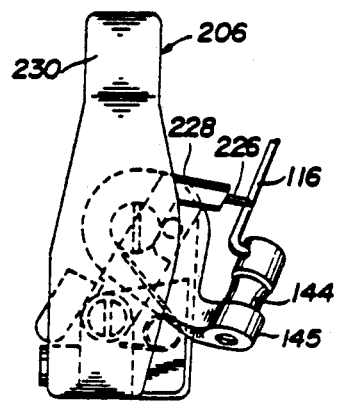
FIG. 24 is a partial, plan view of the trigger portion of the reel shown in FIG. 23 with the trigger in the cocked position.
Figure 23:
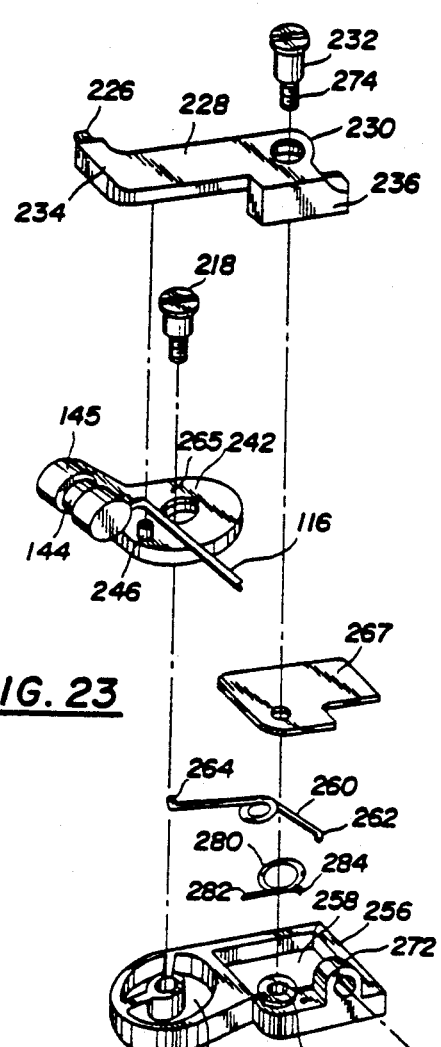
FIG. 23 is an exploded perspective view of a third embodiment of an open-face spinning-type reel of the invention.
Figure 25:
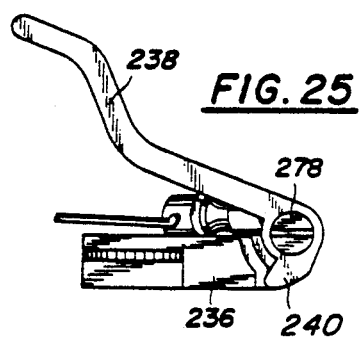
FIG. 25 is a lateral view of the trigger portion as shown in FIG. 24.
Figure 27:
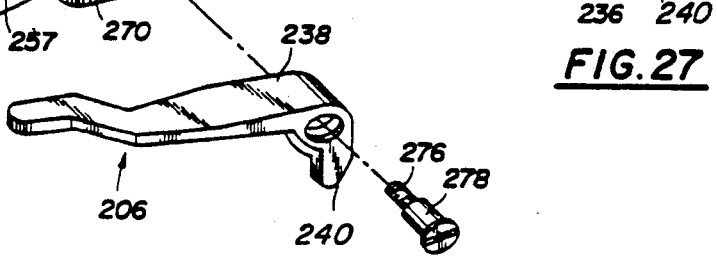
FIG. 27 is a lateral view of the trigger portion as shown in FIG. 26.
Figure 26:
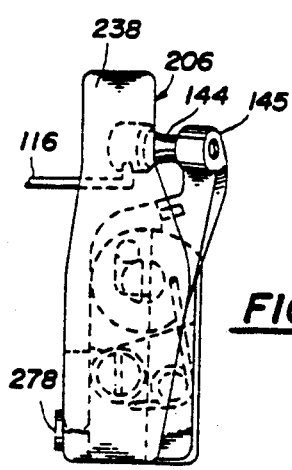
FIG. 26 is a partial, plan view of the trigger portion of the reel shown in FIG. 23 with the trigger in the released position.
Figure 28:
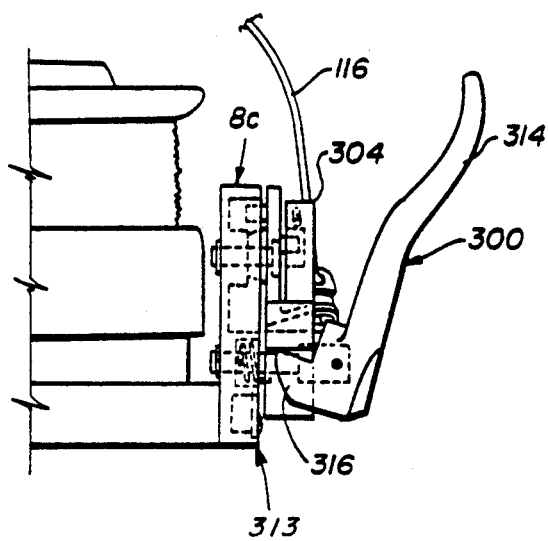
FIG. 28 is a lateral, fragmentary view of a fourth embodiment of a line control mechanism of the invention shown with the fourth cocked and the bail in the opened position.
Figure 29:
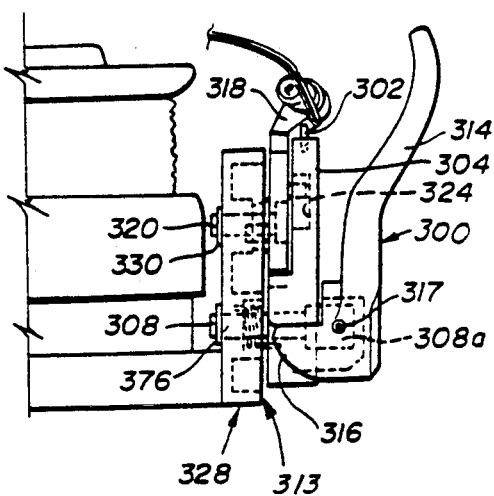
FIG. 29 is a lateral, fragmentary view similar to FIG. 28, but with the trigger in the released mode and the bail in the closed position.
Figure 30:
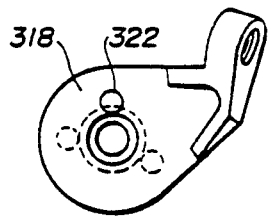
FIG. 30 is a plan view of a crank member used to move the bail in the fourth embodiment shown in FIG. 28.
Figure 31:
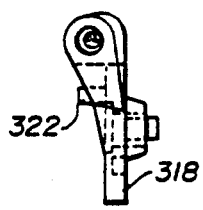
FIG. 31 is a lateral view corresponding to FIG. 30.
Figure 32:
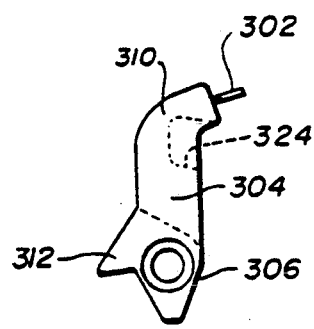
FIG. 32 is a plan view of the bail trip lever in the embodiment of the reel shown in FIG. 28.
Figure 33:
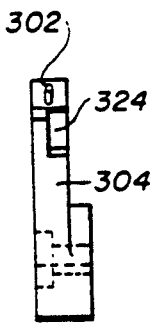
FIG. 33 is a lateral view corresponding to FIG. 32.

The line holding means 206 comprises a pin 226 on a crank arm 228 which moves between a fishing line holding position as shown in FIG. 24 and a non-holding/release position as shown in FIG. 26.

The crank arm 228 is pivoted at the end 230 on a pin 232 while the free end 234 carries the pin 226. A butt portion 236 extends laterally from the end 230 of the arm 228 and there is a longitudinal channel (not shown) cut out of the underside of the arm 228.

The trigger assembly 206 includes a pivoted trigger 238 having a lateral cam portion 240 that engages the butt portion 236 of crank arm 228 to cause arm 228 to move clockwise, i.e., from the position shown in FIG. 26 to the position shown in FIG. 24, upon movement of the trigger 238.

A crank 242 moves on pivot pin 218 in an arc as shown by comparing FIG. 24 with FIG. 26. The bail 116 and the line guide 144 are mounted to the crank 242 via the drilled offset portion 145.

The crank 242 includes a projection (pin) 246 that rides in the aforesaid channel in the crank arm 228 to cause the crank 242 to move in a clockwise direction upon similar movement of the arm 228.

As previously stated, the crank arm 228 is pivoted on the pin 232 that is screwed into the base portion 256 of the trigger assembly 206. Base portion 256 includes a recess 258 in which a toggle spring 260 is captured to swing from one stable position (see FIG. 24) through dead center to another stable position (see FIG. 26). One end 262 of the spring 260 bears on the recess 258 and the other end 264 hooks into hole 265 of crank 242 to bias it toward the line winding (closed) position (FIG. 26) of the bail 116 in one of its stable positions and toward the line-freeing (open) position (FIG. 24) in the other of its stable positions.

A plate 267 is provided to cover the recess 258 and retain the spring 260 therein.

Base portion 256 also includes an arcuate recess 257 that functions with a pin (not shown) on crank 242 to limit the extent of clockwise movement of the crank 242 upon upward (cocking) movement of trigger 238 and counter-clockwise movement of crank 242 upon release of the trigger 238. Base portion 256 also includes a circular lug 270 and an arcuate lug 272. Lug 270 is tapped to receive the threaded end 274 of pin 232 and lug 272 is tapped to receive the threaded end 276 of pin 278.

The coil spring 280 is the means in trigger mechanism 206 to bias arm 228 counter-clockwise (ccw) toward the line release position of pin 226. The spring 280 fits over lug 270 and its end 282 engages butt 236 of arm 228 while the other end 284 bears against lug 272 so that spring 280 is compressed when the arm 228 is moved clockwise (cw) by action of cam portion 240 on the butt 236 of arm 228 as trigger 238 is cocked.

Referring to FIGS. 28-40, a fourth embodiment of the new reel is illustrated which is, in effect, a variation of the second and third embodiments and is designed for use with the triggered bail mechanism disclosed in U.S. Pat. No. 4,676,450.

Figure 34:
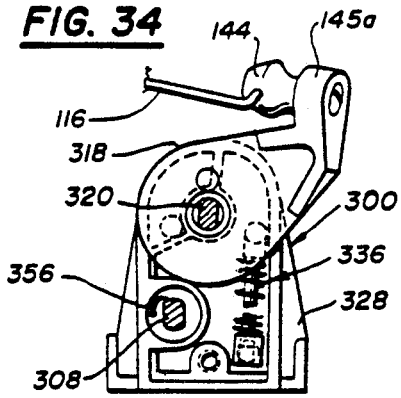
FIG. 34 is a partial, sectional view of the trigger assembly of the reel of FIG. 28 with the bail in the closed position.
Figure 35:
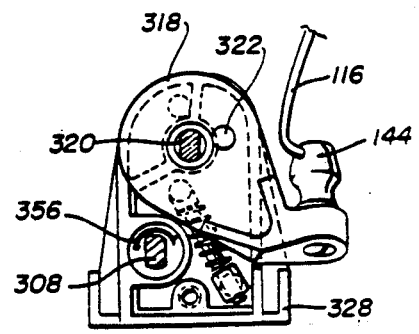
FIG. 35 is a sectional view similar to FIG. 34, but with the bail in the opened position.
Figure 37:
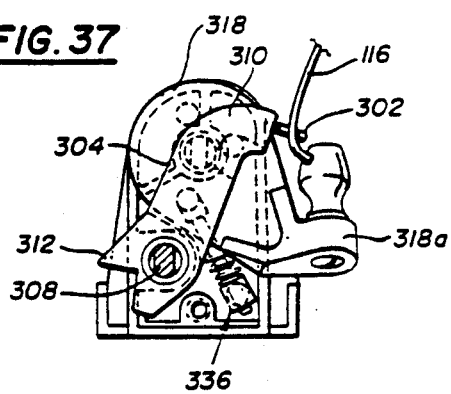
FIG. 37 is a sectional view similar to FIG. 35, but with the bail in the opened position.
Figure 38:
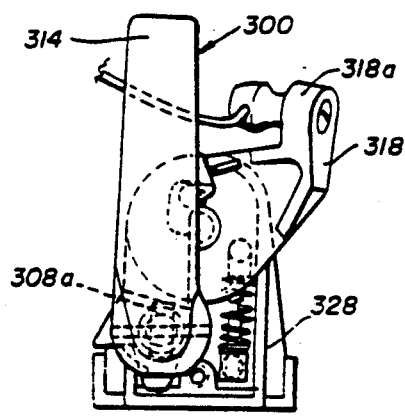
FIG. 38 is a partial, plan view of the fourth embodiment of trigger assembly of the invention with the bail in the closed position.
Figure 39:
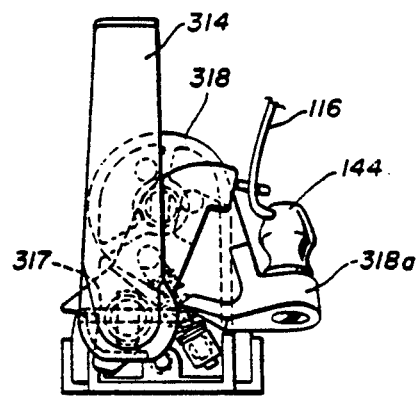
FIG. 39 is a plan view similar to FIG. 38, but with the bail in the opened position.

The line control mechanism 8c comprises a trigger assembly 300 having a pin 302 and crank arm 304 which move between a fishing line holding (cocked) position as shown in FIGS. 37 and 39 and a non-holding/release (uncocked) position as shown in FIGS. 34, 35 and 38.

The crank arm 304 on the bail unit 314 is pivoted at the end 306 on a trigger holder pin 308 while the free end 310 carries the pin 302. A butt portion 312 extends laterally from the end 306.

Figure 36:
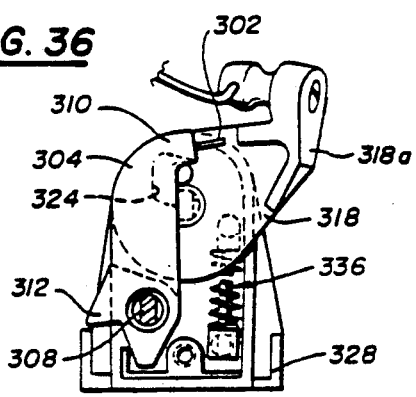
FIG. 36 is another partial, sectional view of the trigger assembly of the reel of FIG. 28 with the bail in the closed position.

The rotor 313 has a trigger assembly 300 which includes a pivoted trigger 314 having a lateral cam portion 316 that engages the butt portion 312 of crank arm 304 to cause it to move clockwise, i.e., from the line holding position shown in FIG. 36 to the line release position shown in FIG. 37, upon upward movement of the trigger 314 to the cocked position therefor.

The trigger 314 is pivoted on a pin 317 fitted in the end 308a of pin 308 so that the longitudinal axis of pin 317 is perpendicular to and preferably intersects the longitudinal axis of pin 308. The pin 308 also serves as the pivot for the crank arm 304.

A crank 318 on the bail unit 314 moves about pivot pin 320 in an arc as shown by comparing FIG. 38 with FIG. 39. The bail 116 bail unit 114 and the line guide 144 are mounted to the crank 318 via the drilled offset portion 318a.

The crank 318 includes a projection (pin) 322 that rides in channel 324 in the crank arm 304 to cause crank 318 to move in a clockwise direction upon similar movement of the arm 304.

As previously stated, the crank 318 is pivoted on the pin 320 that fits into opening 326 in the base portion 328 of the trigger assembly 300. Pin 320 is fixed in its functional position by a horseshoe retainer 330 that snaps into the pin slot 332.

Rotor portion 328 includes a recess 334 in which a toggle spring assembly 336 is captured to swing from one stable, closed position (see FIG. 36) through dead center to another stable, open position (see FIG. 37).

The spring assembly 336 includes a rod 338 to which a pin member 340 is fixed at one end while a second pin member 342 slides on the other end. The coil spring 344 is compressed between the members 340 and 342. Member 340 fits into the bore 348 in crank 318. With this arrangement, spring assembly 336 biases crank 318 toward the line winding (closed) position (FIG. 36) of the bail 116/bail unit 114 in one of its stable positions and toward the line-freeing (open) position of the bail 116/bail unit 114 (FIG. 37) in the other of its stable positions.

A plate 350 is provided to cover the recess 334 and retain the spring assembly 336 therein. A screw 352 threads into bore 354 to hold the plate 350 in place on the base portion 328.

A coil spring 356 serves to bias crank arm 304 ccw toward the line release position of pin 302. The spring 356 fits in recess 358 and its end 360 engages butt 312 of crank arm 304 while the other end 362 engages a hole 364 in the base of recess 358. Thus, spring 356 is compressed when the crank arm 304 is moved cw by action of tab 316 on the butt 312 of crank arm 304 and trigger 314 is cocked.

The crank arm 304 and trigger 314 are held in operating position on the base portion 328 by the pin 308. The pin 308 fits through the bore 366 in crank arm 304 so bore shoulder 368 engages pin shoulder 370. Pin end 372 extends through slot 374 in base portion 328 and is held therein by horseshoe retainer 376 fitted into slot 378. To complete the connection of trigger 314 into the assembly 300, pin 317 extends through bore 380 in the trigger 314 and bore 382 in the pin 308 permitting trigger 314 to pivot on the pin 317 and crank arm 304 to pivot on pin 308.

Pin 308 has an axis transverse to the longitudinal axis of the reel upon which it is mounted while the pin 317 extending through the bore 382 has an axis perpendicular to the axis of pin 308. Crank arm 304 pivots on an axis perpendicular to and intersecting the axis of pin 308.

In FIG. 41, a modified form of trigger is shown at 500. The trigger 500 has an overall L-shape with a first leg 502 to be grasped by the operator and a transverse leg 504 to engage and reposition the bail unit 114, as in the prior embodiments, upon the trigger 500 being pivoted about an axis 506 at the juncture of the legs 502, 504. The trigger 500 is hinged to a web 508 which connects between a mounting stem 510, that is integral with a housing 512, for connecting the reel to a rod 514, and a foot 516, which is integral with the stem, and conforms, and is secured, to the rod 514. Lifting up on the trigger leg 500 pivots the trigger 500 ccw about the axis 506 to bear the leg 504 against the bail unit 114 to effect repositioning thereof as in the earlier described embodiments The advantage of this arrangement is primarily that the trigger is always accessible to the user regardless of the position of the rotor 518 which includes a bail unit 114. The bail unit 114 is configured on the body 520 of the rotor 518 substantially the same as in the previously described embodiments.

OPERATION

The operation of improved spinning-type fishing reels of the invention permits the user to hold a rod 22 with one hand 70 and prepare the reel 4 for casting simply by the use of that hand without need to contact the line 24 with the index finger 72 or any other part of hand 70 nor the other hand (not shown) of the user. Thus, the new line control device 2 of the invention makes it possible for a fisherman using the improved reel 4 to go through a complete casting operation with the rod 22 by simply pulling on/cocking the trigger 50 and then again releasing it as a part of a cast.

Such trigger manipulation swings the bail from the closed (line winding) position to the open (line casting) position and, simultaneously automatically controls the line 24 to prevent it from unreeling from the spool 12 until the trigger 50 is released At the end of the cast, a brief turning of crank handle means 20 will move the bail 16/bail unit 14 across to the closed position to pick up the line in the guide member 44 in known manner. Alternatively, the user can grasp and move the bail 16/bail unit 14 into its closed position. Hence, the rod is again prepared to hook a fish and reel it in, all this being accomplished without need for the fisherman to contact the line 24 with a finger or other body part.

The series of parts movement in the casting operation as just described can be further understood by reference to the drawings.

Figure 4:
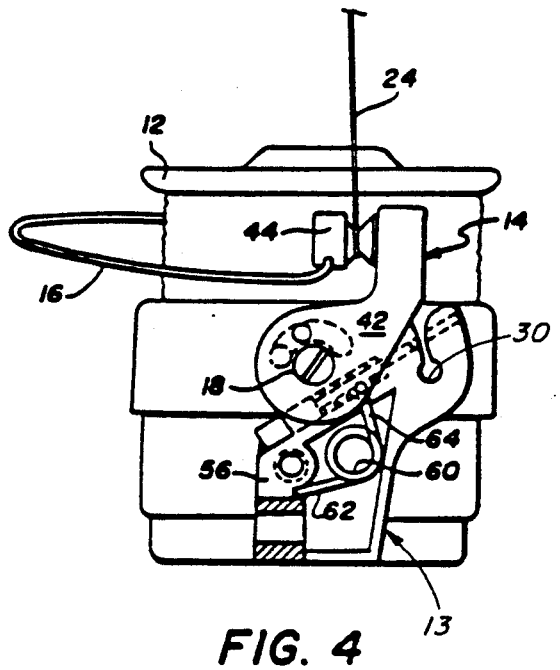
FIG. 4 is a partial, sectional view taken on the line IV—IV of FIG. 1.
Figure 5:
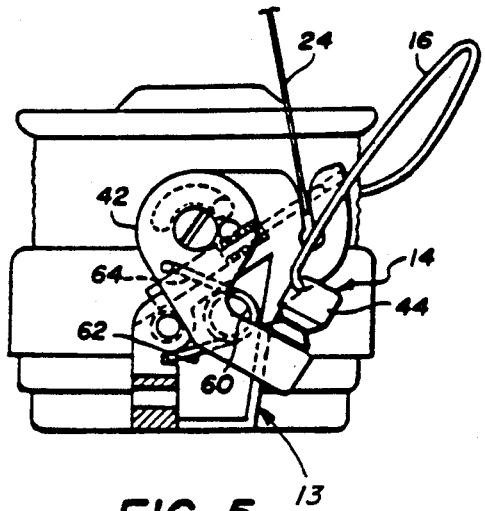
FIG. 5 is a sectional view similar to FIG. 4 showing another position of the line holding means of the invention in use of the reel.

At the conclusion of a retrieval of line 24 with reel 4, the arrangement of parts is as shown in FIG. 4 with line 24 passing from spool 12 over the guide member 44 and out through the rod guides (not shown) of the rod 22. To prepare for casting, the user, while holding the rod 22 in hand 70, pulls upon on the trigger 50. This causes lever member 40 to move the bail 16 across the reel 4 from the closed position (FIG. 4) to the open position (FIG. 5). In the course of this bail movement, the arc of the guide 44 will pass over the entrance 32 of the guideway 30. The dimensioning of the lever member as to pivot point, spacing to the butting end 34a of pin 34, etc. is arranged so that the pin 34 is still retracted from the entrance 32. As the bail moves further toward and to the completion of its swing, the line 24 enters the guideway 30 and, simultaneously, the pin is moved by the lever member 40 across entrance 32, thereby capturing the line 24.

Figure 6:
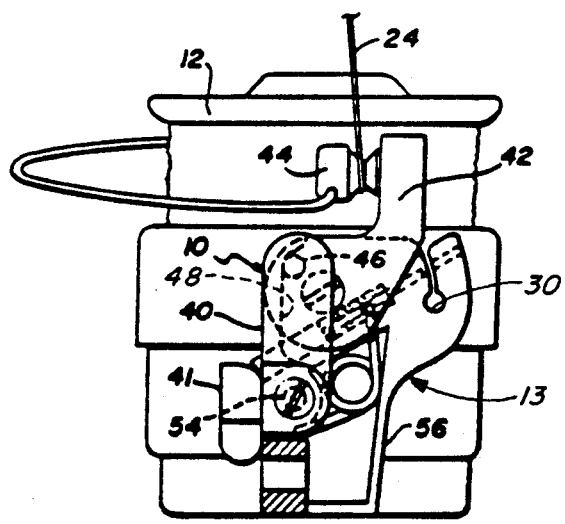
FIG. 6 is a partial, sectional view taken on the line VI—VI of FIG. 1.
Figure 7:
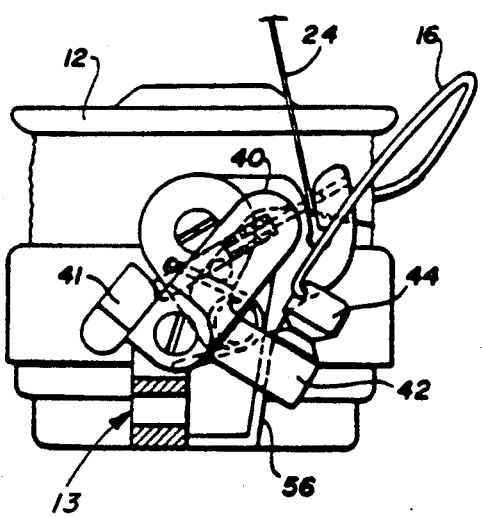
FIG. 7 is a sectional view similar to FIG. 6 showing another position of the line holding means of the invention in use of the reel.
Figure 8:
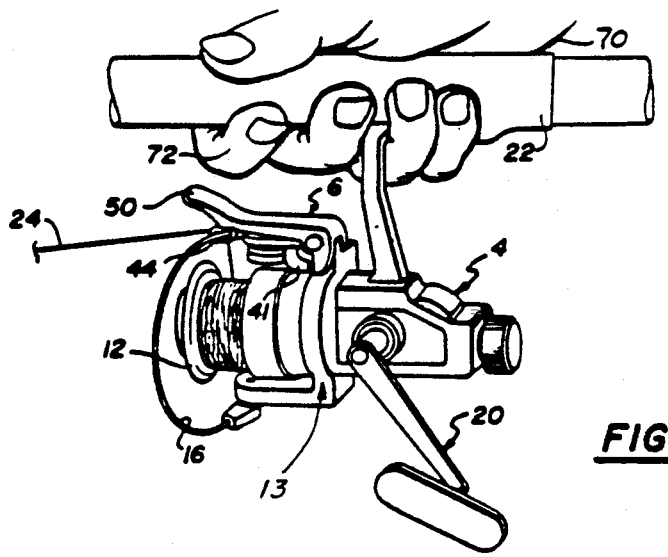
FIG. 8 is a perspective view of the fishing reel of FIG. 1 shown from the reverse side.
Figure 9:
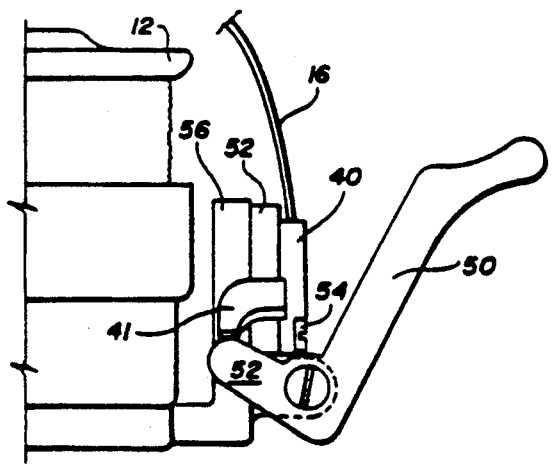
FIG. 9 is a lateral, fragmentary view of the reel of FIG. 1 shown with the reel's trigger cocked and the bail in the opened position.

Until the user is ready to cast, the trigger 50 is held in the upper cocked position (see FIG. 1). This keeps the bail 16 in the open position and the line 24 retained against unreeling from spool 12 other than by rotation of the spool 12 bail unit 14. When the cast is made with the rod 22, the trigger 50 is released whereupon the pressure from spring 36 forces pin 34 to move out entrance 32. This spring pressure, via pin end 34a bearing on the lever member 40, returns it to the position shown in FIG. 6. At the same time, the bail 16 remains in the opened position via action of spring 60 and since the spring 36 does not move the bail to the closed position since the pin 46 on the crank 42 is not captured by the lever member 40.

When sufficient line has paid off the spool 12, the user takes a turn on the crank handle means 20 which causes the crank 42 to flip spring 60 over from the position shown in FIG. 5 to the position shown in FIG. 4 and to swing the bail into the closed position during which the bail crosses the line 24 to pick it up and move it onto the guide portion 44 (see FIG. 4). The fisherman is then ready to reel in the line as soon as a fish is hooked. Hence with the improved reels of the invention, the entire line casting and retrieval operation is accomplished without the user's having to directly handle the fishing line. Thus, the invention provides improved line control on spinning type fishing reels.

The crank means 20 for shifting the bail 16 from a casting (open) position to a winding (closed) position includes not only a crank (unnumbered), but other elements conventional in the art and can be of a variety of forms, e.g. see U.S. Pat. No. 4,389,027. The improvements of the invention are intended for use with any of such conventional spincast reel bail movement mechanisms.

The method of use of the second embodiment reel 102 shown in FIGS. 15-21 is essentially the same as for the reel 2, but in the operation of the reel 102, the fishing line 124 does not enter a guideway in the course of being held by the pin 126 and instead enters a line receiving opening 180 defined by the crank 142 and line guide 144. At the bottom of the opening 180 is a U-shaped line seat which intercepts the line and draws the line around the line spool 112 as the rotor 113 is rotated in a line retrieval direction.

With reel 104, when the line has been cast and the bail 116/bail unit 114 is positioned for catching a fish, the bail 116 and line guide 144 will be in the position shown in FIG. 21 so that the line 124 will run from the spool 112 over the guide 144 out to the hook and tackle. When a fish is hooked or the line 122 is to be retrieved for any other reason, turning the crank 120 will rotate the bail ccw thereby causing the line to be wound onto the spool 112 until the hook and tackle approach the rod tip. During this line retrieval operation, the pin 126 remains, as shown in FIG. 21, withdrawn from any contact with the line 124.

When the reel user is ready to make a cast, the trigger 138 is pulled/cocked, which lifts its free end up, away from the bail unit 114. This causes the bail unit 114 to swing to the open position as shown in FIG. 22 during which time the line 124 is tensioned by the weight of hook and tackle on its end. Hence as the bail swings across from the closed position toward the opened position, the line 124 remains in contact with the guide 144 until just before the bail 116 and guide 144 reach the full open position as shown in FIG. 22, at which time the line slips off the guide 144. However, as the guide 144 moves toward the opened position, the pin 126 is moved by the arm 128 so it follows along. Thus, by the time the guide 144 reaches the cw position (FIG. 18) and the line slips from it, the pin 126 has positioned itself (see FIG. 22) in the line engaging position wherein it catches the line 124 as shown in FIG. 15. At the same time, the bail 116 overlaps the pin 126 (see FIG. 22) so that the pin 126 blocks the line receiving opening 180 and line 122 remains captured by the pin 126 with the opening 180. Alternatively, the parts can be dimensioned so that the line slips off of the guide 144 as the bail unit 114 realizes the open position therefor.

The fisherman is now ready to make a cast. To do this, he/she whips the rod and line in an arc in the desired direction while holding the trigger 138 in the pulled (cocked) position. At the proper moment, he/she frees the line 124 to pay off the spool 112 by releasing the trigger 138 which, in turn, allows the arm via the biasing of the spring 168 to swing ccw thereby also moving the pin ccw from a blocking position to a release position to free the line for unreeling. The pin 126, about which the line wraps, effectively prevents withdrawal of line other than by rotation of the rotor and/or spool.

The operation of reels equipped with the third embodiment line handling mechanisms of the invention will be understood by those skilled in the art to be essentially like that described for reel 104.

The reels equipped with the fourth embodiment of line handling mechanisms of the invention are improved as compared with the other three embodiments because the trigger 314 and the crank arm 304 both function on a common retention pin 308. In the operation of such reels, the crank arm 304 and its line retention pin 302 pivot about the pin 308 in a plane perpendicular to the axis of the pin 308. Trigger 314, while mounted to the pin 308, pivots on the axis of pin 317 perpendicular to the axis of pin 308 that lies in a plane parallel to the plane of rotation of the crank arm 304.

As will be apparent from the foregoing description, the entire sequence of steps of casting and reeling line with my improved fishing reels is performed without need for the fisherman to contact the fishing line with a finger.

I claim:

1. In an open-face spinning-type fishing reel having a housing; a spool carried on the housing and onto which line is wound; and a rotatable rotor for directing line onto the spool, said rotor including a bail unit, said bail unit being movable between (a) a closed line winding position in which line from the spool is engaged by the ball unit to prevent unwinding of line from the spool in the absence of one of said spool and rotor being rotated and (b) an open casting position in which line can pay out of the spool without rotation of the spool or rotor, the improvement comprising:
   a trigger assembly including a trigger mounted to one of the housing and rotor for movement relative thereto between a cocked position and an uncocked position;
   means on the trigger and means on the ball unit cooperating with each other for moving the bail unit from its closed position to its open position as an incident of the trigger moving from its uncocked position to its cocked position; and
   line holding means on said rotor operated by said trigger assembly for engaging line from the spool with the bail unit in its open position and the trigger in its cocked position for preventing line from unwinding from the spool in the absence of rotation of at least one of said rotor and spool.

2. The fishing reel of claim 1 wherein the trigger is movably mounted to the housing.

3. The fishing reel of claim 1 wherein the trigger is rotatably mounted to the housing.

4. The fishing reel of claim 1 wherein the spool has a longitudinal axis and the trigger is mounted to the housing for rotation about an axis that is transverse to the longitudinal axis of the spool.

5. The fishing reel of claim 1 wherein the trigger is movably mounted to the rotor.

6. The fishing reel of claim 1 wherein the rotor rotates about an axis and the trigger is pivotably mounted to the rotor for rotation about an axis that is transverse to the rotational axis of the rotor.

7. The fishing reel of claim 1 wherein the line holding means comprises a pin against which line from the spool bears with the trigger cocked and the bail unit in its open position.

8. The fishing reel of claim 1 wherein the line holding means comprises an arm movable relative to the rotor between a line holding position and a release position.

9. The fishing reel of claim 1 wherein the line holding means comprises an arm on said rotor movable relative to the rotor between a line holding position and a release position and there are cooperating means on the trigger assembly and line holding means for moving the line holding means from the release position to the line holding position as an incident of the trigger moving from its uncocked position to its cocked position.

10. The fishing reel of claim 1 wherein the line holding means comprises an arm on said rotor with a pin thereon, said arm being movable relative to the rotor between a line holding position wherein line from the spool extends at least partially around the pin with the bail unit in its open position and a release position wherein the line can pay freely out of the spool without interference from said pin with the bail unit in its open position.

11. The fishing reel of claim 1 wherein said line holding means comprises an arm on said rotor movable relative to the rotor between a line holding position wherein line from the spool is engaged by the line holding means with the bail unit in its open position and a release position wherein line can pay freely out of the spool without interference from said line holding means with the bail unit in its open position, there being cooperating means on the trigger assembly and line holding means for moving the line holding means from its release position to its line holding position as an incident of the trigger moving from its uncocked position to its cocked position, there being cooperating means on the bail unit and at least one of the line holding means and trigger assembly for moving the bail unit from its closed position to its open position as an incident of the trigger moving from its uncocked position to its cocked position.

12. In an open-face spinning-type fishing reel having a housing; a spool carried on the housing and onto which line is wound; and a rotatable rotor for directing line onto the spool, said rotor including a bail unit, said bail unit being movable between (a) a closed line winding position in which line from the spool is engaged by the bail unit to prevent unwinding of line from the spool in the absence of one of said spool and rotor being rotated and (b) an open casting position in which line may pay out of the spool without rotation of the spool or rotor, the improvement comprising:
   a trigger assembly including a trigger mounted to one of the housing and rotor for movement relative thereto between a cocked position and an uncocked position; and
   line holding means on said rotor operated by said trigger assembly for engaging line from the spool with the bail unit in its open position and the trigger in its cocked position for preventing line from unwinding from the spool in the absence of rotation of at least one of said rotor and spool, wherein a post on said rotor supports at least part of said bail unit for rotation between its open and closed positions and the trigger is mounted to the post.

13. In an open-face spinning-type fishing reel having a housing; a spool carried on the housing and onto which line is wound; and a rotatable rotor for directing line onto the spool, said rotor including a bail unit, said bail unit being movable between (a) a closed line winding position in which line from the spool is engaged by the bail unit to prevent unwinding of line from the spool in the absence of one of said spool and rotor being rotated and (b) an open casting position in which line cay pay out of the spool without rotation of the spool or rotor, the improvement comprising:

a trigger assembly including a trigger mounted to one of the housing and rotor for movement relative thereto between a cocked position and an uncocked position; and line holding means on said rotor operated by said trigger assembly for engaging line from the spool with the bail unit in its open position and the trigger in its cocked position for preventing line from unwinding from the spool in the absence of rotation of at least one of said rotor and spool, wherein said bail unit has first and second bail arms and a post on the rotor supports one of the bail arms for rotation about a first axis and the trigger is mounted movably to the post about a second axis that is transverse to and intersects the first axis.

14. An open-face spinning-type fishing reel comprising:

a spool onto which line is wound about a longitudinal axis;

a rotatable rotor for directing line onto the spool, said rotor having a ball unit including a bail and line guide, said bail unit being movable between (a) a closed line winding position in which line from the spool is engaged by the bail unit to prevent unwinding of line from the spool in the absence of one of said spool and rotor being rotated and (b) an open casting position in which line can pay out of the spool without rotation of the spool or rotor;

a trigger assembly including a trigger movable between a cocked position and an uncocked position;

means on the bail unit and means on the trigger cooperating with each other for causing said bail to move from its closed position to its open position as an incident of the trigger moving from its uncocked to its cocked position; and line holding means on said rotor and operated by said trigger assembly for engaging line from the spool with the bail unit in its open position as an incident of the trigger being moved from its uncocked to its cocked position and for preventing line from unwinding from the spool in the absence of rotation of at least one of said rotor and spool with the bail unit in its open position and the trigger in its cocked position.

15. The fishing reel of claim 14 wherein the spool has a longitudinal axis, said fishing reel has a housing including a mounting stem for attaching the fishing reel to a rod and the trigger is mounted to the housing for rotation about an axis that is transverse to the longitudinal axis of the spool.

16. The fishing reel of claim 14 wherein said rotor rotates about an axis and the trigger is pivotably mounted to the rotor for rotation about an axis that is transverse to the rotational axis of the rotor.

17. The fishing reel of claim 14 wherein said line holding means comprises a pin against which line from the spool bears with the trigger cocked and the bail unit in its open position.

18. The fishing reel of claim 14 wherein said line holding means comprises an arm on said rotor movable relative to the rotor between a line holding position and a release position and there are cooperating means on the trigger assembly and line holding means for moving the line holding means from the release position to the line holding position as an incident of the trigger moving from its uncocked position to its cocked position.

19. The fishing reel of claim 14 wherein the line holding means comprises an arm on said rotor with a pin thereon, said arm being movable relative to the rotor between a line holding position wherein line from the spool extends at least partially around the pin with the bail unit in its open position and a release position wherein the line can pay freely out of the spool without interference from said pin with the bail unit in its open position.

20. The fishing reel of claim 14 wherein said line holding means comprises an arm on said rotor movable relative to the rotor between a line holding position wherein line from the spool is engaged by the line holding means with the bail unit in its open position and a release position wherein line can pay freely out of the spool without interference from said line holding means with the bail unit in its open position, there being cooperating means on the trigger assembly and line holding means for moving the line holding means from its release position to its line holding position as an incident of the trigger moving from its uncocked position to its cocked position, there being additional cooperating means on the bail unit and at least one of the line holding means and trigger assembly for moving the bail unit from its closed position to its open position as an incident of the trigger moving from its uncocked position to its cocked position.

21. In an open-face spinning-type fishing reel having a housing; a spool carried on the housing and onto which line is wound; and a rotatable rotor for directing line onto the spool, said rotor including a bail unit, said bail unit being movable between (a) a closed line winding position in which line from the spool is engaged by the bail unit to prevent unwinding of line from the spool in the absence of one of said spool and rotor being rotated and (b) an open casting position in which line cay pay out of the spool without rotation of the spool or rotor, the improvement comprising:

a trigger assembly including a trigger mounted to one of the housing and rotor for movement relative thereto between a cocked position and an uncocked position; and line holding means on said rotor operated by said trigger assembly for engaging line from the spool with the bail unit in its open position and the trigger in its cocked position for preventing line from unwinding from the spool in the absence of rotation of at least one of said rotor and spool, wherein said bail unit has first and second bail arms and a post supports one of the bail arms for rotation about a first axis and the trigger is mounted movably to the post about a second axis that is transverse to and intersects the first axis.

22. In an open-face spinning-type fishing reel having a spool onto which line is wound; a rotor that is rotatable to direct line onto the spool and including a body and a bail unit on the body that is movable relative to the rotor body between (a) a closed line winding position and (b) an open casting position, there being a line-receiving opening on the rotor including a generally U-shaped line seat at the base of the U-shaped line seat and opening in the direction of rotation of the rotor as line is being retrieved, said rotor being rotatable in a first direction to cause said U-shaped seat to engage the line and guide the line around the spool as the rotor is rotated, the improvement comprising:

line holding means for blocking the line in the line-receiving opening with the bail unit inn its open position to thereby prevent the line from freely unwinding from the spool.

23. The fishing reel of claim 22 wherein the blocking means is movable relative to the bail unit between a line holding position wherein the blocking means blocks the line in the U-shaped opening and a release position wherein the line can be moved into and out of the U-shaped opening 24. The fishing reel of claim 23 wherein said fishing reel has a housing including a stem for mounting the fishing reel to a rod, further including a trigger assembly on one of said rotor and housing, said trigger assembly including a trigger movable relative to the rotor between a cocked position and uncocked position, there being cooperating means on the trigger and line holding means for moving the blocking means from its release position to its line holding position as an incident of the trigger moving from its uncocked position to its cocked position.

25. The fishing reel of claim 24 including cooperating means on the bail unit and one of the line holding means and trigger assembly for moving the bail unit from its closed position to its open position as an incident of the trigger moving from its uncocked position to its cocked position.

26. The fishing reel of claim 25 including means for moving the line holding means from its line holding position towards its release position with the trigger in its uncocked position.

27. The fishing reel according to claim 22 wherein the bail unit includes a bail that is rotatable about a first axis and the line holding means includes an arm that is pivotable about a second axis that is substantially parallel to the first axis.

28. The fishing reel according to claim 27 wherein the arm on the holding means has a pin that projects therefrom in cantilever fashion and into close proximity to a part of the bail with the line holding means blocking the line-receiving opening.

* * * * *